United States Patent [19]
Yan

[11] Patent Number: 5,360,552
[45] Date of Patent: * Nov. 1, 1994

[54] REMOVAL OF CYANIDE, SULFIDES AND THIOSULFATE FROM AMMONIA-CONTAINING WASTEWATER BY CATALYTIC OXIDATION

[75] Inventor: Tsoung Y. Yan, Philadelphia, Pa.

[73] Assignee: Mobil Oil Corporation, Fairfax, Va.

[*] Notice: The portion of the term of this patent subsequent to Aug. 16, 2011 has been disclaimed.

[21] Appl. No.: 118,339

[22] Filed: Sep. 9, 1993

Related U.S. Application Data

[63] Continuation-in-part of Ser. No. 61,127, May 12, 1993.

[51] Int. Cl.$^5$ ............................................. C02F 1/72
[52] U.S. Cl. ............................. 210/762; 210/762; 210/904; 210/908; 210/916; 210/903
[58] Field of Search ............... 210/763, 903, 904, 916, 210/762, 908

[56] References Cited

U.S. PATENT DOCUMENTS

| | | |
|---|---|---|
| 3,650,949 | 3/1972 | Hager et al. |
| 3,672,836 | 6/1972 | Brown |
| 4,582,690 | 4/1986 | Rempel et al. |
| 4,699,720 | 10/1987 | Harada et al. |
| 4,743,381 | 5/1988 | Bull |
| 4,814,545 | 3/1989 | Rule et al. |
| 4,830,999 | 5/1989 | Drago et al. |
| 4,925,569 | 5/1990 | Chou et al. |
| 4,992,181 | 2/1991 | Siebert |
| 5,112,494 | 5/1992 | Yan |
| 5,207,927 | 5/1993 | Marinangeli et al. |

FOREIGN PATENT DOCUMENTS

| | | |
|---|---|---|
| 042851 | 4/1979 | Japan |
| 124558 | 9/1979 | Japan |
| 919443 | 2/1963 | United Kingdom |

OTHER PUBLICATIONS

"Aqueous Wastes from Petroleum and Petrochemical Plants", Beychok, 1967, pp. 208–211.
"Oxidation of Sulfide-Containing Refinery Wastes by Air", Chemical Abstracts Reference, Abegg et al., vol. 58, pp. 3195–3196.

*Primary Examiner*—Neil McCarthy
*Attorney, Agent, or Firm*—A. J. McKillop; D. P. Santini; G. L. Harris

[57] ABSTRACT

Waste water chemical oxygen demand is reduced from a waste water by passing the water in the presence of an oxidizing agent through an adsorbent porous solid substrate, preferably zeolite A, zeolite X, zeolite Y, ZSM-5, erionite, or chabazite which has been partially ion exchanged with a water insoluble metal compound, copper (Cu), that cataytically facilitates oxidation of the offensive substances or the components in the waste water that increase its chemical oxygen demand, such as cyanide, sulfide, thiosulfate, sulfite, mercaptan, or disulfide. The preferred oxidizing agent is air. It is desired to develop a process for waste water treatment that is effective at reducing the concentration of the offensive substances in the waste water while minimizing the deposition of undesirable residues into the treated waste water. This process is effective in treating waste water from industrial plants, including petroleum refineries, chemical plants, pulp and paper plants, mining operations, food processing plants, and electroplating operations to reduce the concentration of the offensive substances while minimizing deposition of undesirable residues into the treated waste water.

16 Claims, 3 Drawing Sheets

REMOVAL OF CYANIDE, SULFIDES AND THIOSULFATE FROM AMMONIA-CONTAINING WASTEWATER BY CATALYTIC OXIDATION

CROSS REFERENCE TO RELATED APPLICATIONS

This is a continuation-in-part of co-pending U.S. application Ser. No. 08/061,127, filed May 12, 1993, which is incorporated herein by reference in its entirety.

FIELD OF THE INVENTION

This invention is directed to reducing the concentration of offensive substances and to reducing the chemical oxygen demand of waste water by oxidizing various offensive substances including, for example, cyanide, sulfides, sulfites, thiosulfates, mercaptans, and disulfides using a source of oxygen along with an adsorbent substrate treated with a water insoluble compound. It is particularly directed at using Cu ion exchanged onto an adsorbent substrate to catalytically treat waste water containing ammonia, which tends to leach the Cu off the substrate.

BACKGROUND OF THE INVENTION

Waste water streams from industrial plants, including petroleum refineries, chemical plants, pulp and paper plants, mining operations, electroplating operations, and food processing plants, can contain offensive substances such as cyanide, sulfides, sulfites, thiosulfates, mercaptans, and disulfides that tend to increase the chemical oxygen demand (COD) of the waste water streams. Examples of these waste water streams in petroleum refineries include sourwater, sourwater stripper bottoms, and spent caustics. The Environmental Protection Agency (EPA) and various local agencies have placed limits on the allowable levels of these substances in industrial waste water effluent streams.

The conventional methods for waste water treatment include incineration, biological oxidation, and chemical oxidation using $H_2O_2$, $Cl_2$, NaOCl, $ClO_2$, and $KMnO_4$. However, the concentration of the cyanide or other material in the waste water may be too low to treat economically using conventional means, but still too high to meet effluent limitations.

It is well known that sulfides in waste water, including sourwater stripper bottoms or foul water, can be oxidized using air to reduce the chemical oxygen demand of the waste water. These air oxidization processes are commonly practiced in petroleum refineries. In these air oxidation processes, the sulfides are oxidized to thiosulfate, and finally sulfate, as is shown in the following representation:

  (1)

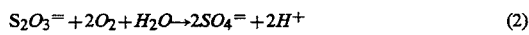  (2)

As reported by Beychok ("Aqueous Wastes from Petroleum and Petrochemical Plants," pp 208-211, John Wiley, 1967), Abegg et. al. ("A Plant for Oxidation of Sulfide Containing Refinery Waste by Air", *Ardol Kohle Erdgas Petrochemie*, September 1962) noted that the reaction rate of sulfide to thiosulfate in the presence of air, as represented by equation (1) above, is relatively rapid. Unfortunately, the reaction rate of thiosulfate to sulfate, as represented by equation (2) above, is extremely low, so that in an air oxidation process, most of the sulfides are converted to thiosulfate. A second, more severe process is required to oxidize the thiosulfate to sulfide. Based on Abegg's data, Beychok observed that, "To oxidize 34% of the sulfides to sulfates requires a tenfold increase in tower volume compared with units that oxidize the sulfides to thiosulfate." Thus, a catalyst is required to convert sulfides and thiosulfate efficiently to sulfate.

Copper is an effective catalyst for oxidation of sulfides and thiosulfate. Beychok also observed that by use of homogeneous $CuCl_2$ catalyst, sulfides can be converted completely to sulfates. Continuous addition of a homogeneous catalyst to the treatment system is undesirable because of the chemical and operating costs, and most importantly, pollution of the treated water by copper.

In developing water treatment processes, particular concern is directed to processes which do not leave residues in the treated stream. Residues can cause additional disposal problems. Materials consumption and cost is also an important factor; thus, it is important to avoid processes which require replenishing the supply of costly catalyst and reagent.

SUMMARY OF THE INVENTION

A treatment method has now been discovered for waste water in which many offensive substances, including cyanide, sulfides, sulfites, thiosulfates, mercaptans, and disulfides, that increase waste water chemical oxygen demand (COD) are found. The process catalytically oxidizes the materials using a source of oxygen and an adsorbent substrate treated with a water insoluble compound.

A further advantage of this invention is that the leeching of Cu from the porous adsorbent substrate can be significantly reduced through the use of a zeolite substrate on which the Cu is ion exchanged to less than the full ion exchange potential of the substrate, and that leeching of Cu from the substrate can be further reduced through the use of a particular zeolite as the substrate.

DETAILED DESCRIPTION OF THE INVENTION

Figure 1A:
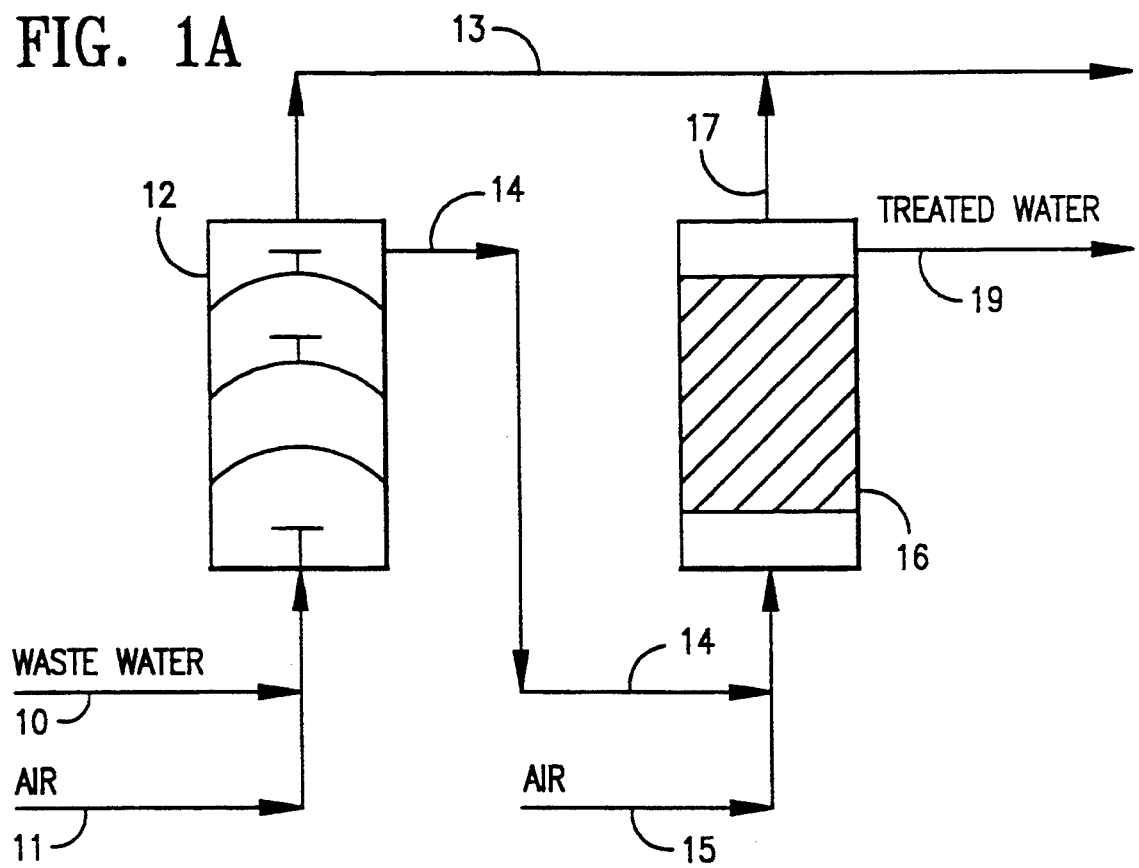
FIG. 1A is a simplified schematic diagram of the process to oxidize thiosulfates in accordance with the invention.

The invention is a process for reducing the concentration of offensive substances and for oxidizing COD causing materials, including, for example, cyanide, sulfides, sulfites, thiosulfate, mercaptans, and disulfides from ammonia-containing waste water in the presence of a source of oxygen through a zeolite substrate partially ion-exchanged with Cu. The process is economically advantageous because it employs a long lasting adsorbent/catalyst which effectively oxidizes the materials, but does not require continuous replacement of the active adsorbent/catalytic component and permits a single catalytic process to replace several other processes.

Waste water chemical oxygen demand (COD) and the concentration of offensive substances in waste water can be reduced in the method of the present invention by feeding an ammonia-containing waste water comprising at least one offensive substance selected from cyanide, sulfide, thiosulfate, sulfite, mercaptan, disulfide and mixtures thereof, along with a source of oxygen into a reaction zone containing a catalyst comprising a zeolite substrate having copper or a copper containing compound deposited thereon. Then the waste water and the source of oxygen are contacted with the catalyst which catalytically oxidizes the offensive substance, and the waste water is discharged from the reaction zone whereby the waste water has a substantially lower concentration of the offensive substance. The oxidation may be carried out under mild conditions which makes the present method easily incorporated into current refinery processes and easily retrofitted into existing refinery treating systems.

U.S. Pat. No. 5,112,494 to Yan, the entire disclosure of which is incorporated by reference herein, teaches various methods for removal of cyanide from waste water including Cu in oxide and sulfide forms on carbon, alumina, silica, silica-alumina, and zeolites. It has been found that Cu can be leached from the porous adsorbent substrate when treating ammonia-containing waste water, e.g. $NH_4^+$ or $NH_3$ at concentrations greater than 1 ppm.

CuO or CuS in aqueous solution is essentially insoluble as indicated by extremely low solubility products. For example, CuS has a solubility-product constant of $8.5 \times 10^{-45}$ (at 18° C.). Represented in terms of the solubility of CuS in water: that is, the quantity of CuS that dissolves in a liter of water, CuS is substantially insoluble in water, having an extremely low solubility of about $5.9 \times 10^{-21}$ g Cu/l. Thus, for application in aqueous systems in the absence of $NH_4^+$ (or $NH_3$), CuO or CuS on any support can be used successfully. However, in the presence of $NH_3$, the water soluble copper tetraamine complex is believed to form, with the formation of this complex leading to leaching of the copper. A representation of the mechanism for this process is as follows:

$$CuO + H_2O \rightleftharpoons Cu^{++} + 2OH^- \quad (3)$$

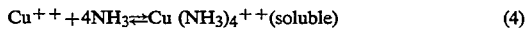

$$Cu^{++} + 4NH_3 \rightleftharpoons Cu(NH_3)_4^{++} \text{(soluble)} \quad (4)$$

An object of this invention is to effectively and inexpensively reduce the concentration of offensive substances and to reduce the COD of waste water containing offensive substances, such as cyanide, sulfides, sulfites, thiosulfate, mercaptans, and disulfides. Another object of the invention is to provide a waste water treating process that consumes no chemicals that lead to additional waste disposal problems. A further objective of this invention is to provide a process that can be practiced by constructing a new processing unit or by modifying an existing processing unit.

A feature of the invention is the removal of offensive substances and in the reduction in waste water COD caused by cyanide, sulfides, sulfites, thiosulfate, mercaptans, and disulfides by oxidizing the materials using a source of oxygen over a water insoluble metal compound deposited on a porous adsorbent substrate.

An advantage of the invention is the reduced cost and improved efficiency in the reduction of waste water COD caused by cyanide, sulfides, sulfites, thiosulfate, mercaptans, and disulfides by employing a porous adsorbent substrate treated with a water insoluble metal compound which catalyzes oxidation of the materials. The invention is also effective in oxidizing other oxidizable components present in the waste water.

A further advantage of this process is that the above catalysis may be accomplished in one process step.

A further advantage of this process is that the water insoluble metal compound is not leached from the porous adsorbent substrate and therefore does not create additional processing requirements.

A further advantage is that the process of this invention is effective to reduce the COD of cyanide-free waste water containing other offensive substances, such as sulfides, sulfites, thiosulfates, mercaptans, and/or disulfides.

It has now been found that copper can be fixed on the zeolite to alleviate the leaching problem due to amine complex formation. In the catalyst preparation, the copper is ion exchanged only partially to the zeolite. The extent of ion exchange should be about 1 to about 90% and preferably about 5 to about 75% of the total ion exchange capacity of the zeolite.

Adsorbent substrates which are useful in the method of this invention include all synthetic and natural zeolites, for example, A, X, Y, mordenite, ZSM-5, ZSM-20, chabazite, erionite, clinoptilolite, and clays.

The Cu ion exchanged on the zeolite can still be attacked by the $NH_3$ to form $Cu(NH_3)_4^{++}$, however, this complex remains a cation with strong chemical affinity with the cationic exchange sites of the zeolite. Thus, its mobility or desorption from the solid surface of the zeolite is low. In addition, by use of partial ion-exchange, there are lots of unexchanged cationic sites in the Na form left on the zeolite which are available to exchange and adsorb any $Cu(NH_3)_4^{++}$ ions passing by. Through this mechanism, the copper leaching problem can be reduced.

A further improvement in the process leading to the preferred form of this invention is the virtual elimination of Cu leaching from the zeolite through the use of selected zeolites as the substrate. Non-limiting examples of such zeolites include zeolite A, zeolite X, zeolite Y, ZSM-5, erionite, and chabazite. In this improvement, the ion exchanged Cu is placed in the cage of the zeolite. The window of the zeolite cage (ranging from about 3.6 to about 10 Angstroms for the examples mentioned above, with zeolite pore sizes ranging from about 4 to about 8 Angstroms, and even from about 4 to about 6 Angstroms also useful in this invention) is large enough for cyanide (about 2.3 Angstroms) to move in freely to react with Cu and $O_2$ for the desired oxidation. Being small in size, $NH_3$ (about 2.8 Angstroms) also moves through freely to react with copper to form $Cu(NH_3)_4^{++}$. Once it is formed, the $Cu(NH_3)_4^{++}$ complex is too large (about 10 Angstroms) to easily move through the window, so the Cu inside the cage will not be leached out.

The catalyst can be shaped in the form of extrudates, cylinders, multi-lobes, pellets, granules, or structure shaped (similar to the packings of static mixers).

A packed bed provides an effective and efficient contactor. In the packed bed, the reaction zone proceeds along the direction of flow. To minimize the pressure drop across the bed and alleviate potential plugging by debris, the reactor can be operated with the bed expanded by greater than 5%. The reactor also can be operated at conditions for an ebullient bed, a fluidizing bed, or a spouting bed. The use of filters or guard beds may also be helpful to avoid plugging the catalyst bed.

Air, readily available, is the preferred oxidizing agent; however, other agents include ozone, hydrogen peroxide, and molecular oxygen, $O_2$. Representations for the mechanisms for the various oxidation processes follow:

1. Oxidation of Sulfides $$S^= + 2O_2 \rightarrow SO_4^=$$

2. Oxidation of Sulfites $$SO_3^= + 0.5O_2 \rightarrow SO_4^=$$

3. Oxidation of Thiosulfates $$S_2O_3^= + 2O_2 + 2OH^- \rightarrow 2SO_4^= + H_2O$$

4. Oxidation of Mercaptans $$2RSH + 0.5O_2 \rightarrow RSSR + H_2O$$

5. Oxidation of Disulfides $$S_2 + 4O_2 \rightarrow 2SO_4^=$$

6. Oxidation of Cyanide $$2CN^- + O_2 \rightarrow 2CNO^=$$

$$2CNO^- + O_2 \rightarrow N_2(g) + 2CO_2$$

All the reaction products are innocuous. The treated water (oxidized effluent) is discharged, while the gas is treated, flared, or incinerated. Any skim oil present can be recovered in an oil-water separator, preferably a separator drum.

The invention can be incorporated into an existing waste water treatment system as shown in FIG. 1A where the waste water containing, for example, sulfides and cyanide, flowing through line 10 is mixed with air flowing through line 11 and the combined stream is fed to an existing typical oxidizing tower unit 12 to convert most of the sulfides in the waste water to thiosulfate. Any resulting gases exit unit 12 via line 13. The oxidized water effluent containing the thiosulfate exits unit 12 via line 14 and is then mixed with air flowing in line 15 and the combined stream passes through the reaction zone of this invention 16, containing the insoluble metal deposited on a porous adsorbent substrate, to convert the thiosulfate to sulfate and to substantially eliminate the cyanide. Typically, the reaction conditions to be maintained in reaction zone 16 are as follows:

| Process Variable | Broad Range | Preferred Range |
|---|---|---|
| Pressure, psia | 10 to 1000 | 14.7 to 200 |
| Temperature, °F. | 30 to 400 | 100 to 300 |
| LHSV, v/v Hr. | 0.1 to 100 | 1 to 20 |
| O$_2$ in Air/COD, mole/mole | 1 to 100 | 1 to 10 |
| pH | 6 to 12 | 7.5 to 10.5 |

Where LHSV is liquid hourly space velocity and COD is chemical oxygen demand.

The resulting gas is separated from the liquid and the excess gas, flowing through line 17, is subsequently treated, flared, or incinerated and then discharged. Treated liquid effluent, flowing through line 19, is the product low in chemical oxygen demand and can be discharged.

Figure 1B:
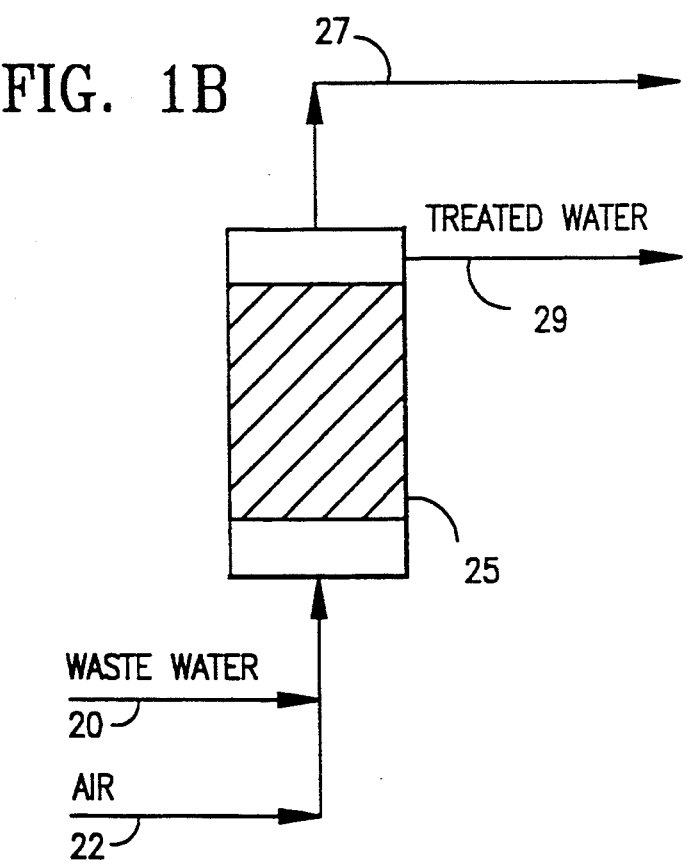
FIG. 1B is a simplified schematic diagram of the process to oxidize sulfides in accordance with the invention.

In the preferred form, the invention is carried out in a fixed bed contactor in the liquid phase which oxidizes sulfides directly to sulfates. As shown in a preferred embodiment of the process in FIG. 1B, waste water is passed through line 20 and is mixed with an oxidizing agent, preferably air, flowing through line 22 and the combined stream is fed to a fixed bed reaction zone 25, the reaction zone containing the catalyst required for the present invention, such as, for example, Cu partially ion exchanged onto zeolite X. The waste water flows at a liquid hourly space velocity (LHSV) ranging from about 0.1 to about 100 hr$^{-1}$ preferably from about 1 to about 20 hr$^{-1}$. The rate of flow of the water is attributable to the pressure imposed on the stream by the upstream processing unit. The reaction zone is maintained at moderate waste water temperatures, typically ranging from about 30° F. to about 400° F., and specifically from about 100° F. to about 300° F., and pressures typically ranging from about 10 to about 1000 psia, specifically about 14.7 to about 200. The amount of oxidizing agent mixed with the waste water is sufficient to provide about 1 to about 100 (preferably about 1 to about 10) times the stoichiometric requirement for oxidizing the oxidizable components in the waste water which include, for example, cyanide, sulfides, sulfites, thiosulfates, mercaptans, and/or disulfides (i.e. the chemical oxygen demand of the water). After oxidation in the reaction zone, the gas is separated from the treated effluent and is discharged through line 27 for additional treating, flaring, or incineration and the treated water, which is low in chemical oxygen demand, is discharged through line 29.

Figure 2:
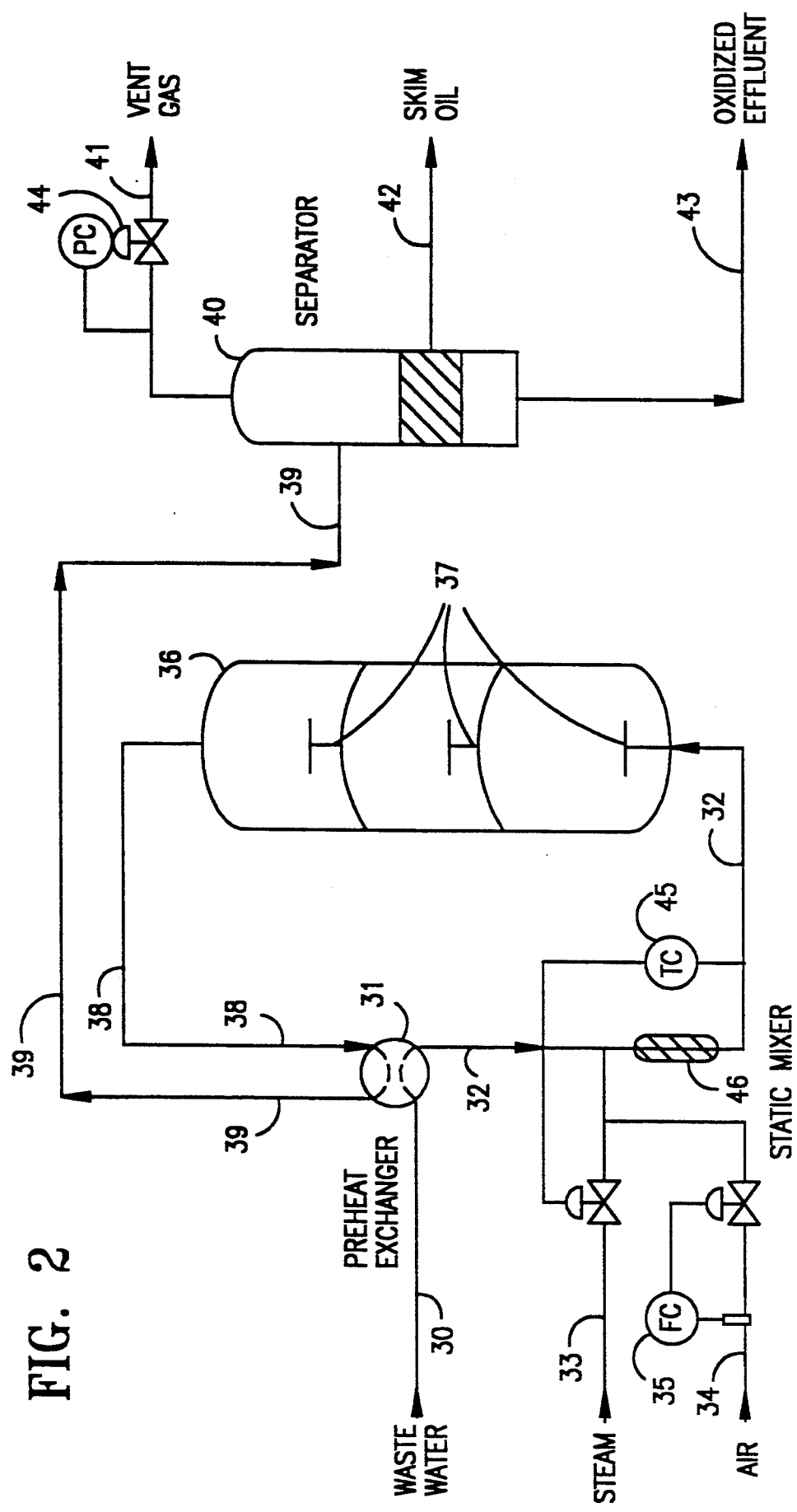
FIG. 2 is a simplified schematic diagram of a generalized typical oxidizing unit for waste water COD reduction.

An embodiment of this invention that is suitable for replacing an existing oxidizing unit is shown in FIG. 2. In this embodiment of the invention, waste water containing, for example, sulfides, is fed through line 30 to preheat exchanger 31 which heats the waste water. The heated water is directed away from the preheat exchanger 31 via line 32, then is mixed with steam from line 33 and air from line 34 using a static mixer 46 contained in line 32 to promote complete mixing of the air and waste water. If required, steam from line 33, under the control of temperature control (TC) 45, is added to the waste water to increase the temperature of the waste water stream to the level desired by the refiner. The temperature of the process may range between about 30° F. and about 400° F., preferably about 100° F. to about 300° F. The air from line 34, under the control of flow control (FC) 35, is added to the waste water in a sufficient quantity to provide about 1 to about 100 (preferably about 1 to about 10) times the stoichiometric requirement of oxygen for oxidizing the oxidizable components in the waste water which include cyanide, sulfides, sulfites, thiosulfates, mercaptans, and disulfides (i.e. the chemical oxygen demand of the water).

The water and air mixture is then fed through line 32 into the oxidizing tower 36 where it contacts the catalyst and the materials are oxidized, thus reducing the chemical oxygen demand of the waste water. In the preferred embodiment, the catalyst is separated into three catalyst beds with interbed distribution and mixing nozzles 37. After leaving the oxidizing tower 36 via line 38, the mixture exchanges heat with the waste water feed in the preheat exchanger 31. The mixture then flows from the preheat exchanger 31 through line 39 to a separator drum 40.

In the separator drum, the gas is separated from the treated water. Any separable oil contained in the waste water feed is also separated from the gas and treated water products. The separated gas stream flows from the separator drum 40 via line 41 through a pressure control station 44 to any required treating, flaring, or incineration. The skimmed oil flows from the separator drum 40 through line 42 to any needed recovery or reprocessing. The treated water flows from separator drum 40 through line 43 to discharge.

Typical process conditions include a liquid hourly space velocity of from about 0.1 hr$^{-1}$ to about 100 hr$^{-1}$ (specifically from about 1 hr$^{-1}$ to about 20 hr$^{-1}$), a temperature from about 30° F. to about 400° F. (specifically from about 100° F. to about 300° F.), a pressure of about 10 to about 1000 psia (specifically about 14.7 to about 200 psig), and an oxidizing agent (non-limiting examples of possible options are air, ozone, $O_2$, polysulfides, and hydrogen peroxide, with air preferred) fed at a quantity sufficient to provide 1 to 100 times (specifically 1 to 10 times) the stoichiometric requirement to oxidize the oxidizable components (including cyanide) in the waste water.

EXAMPLE

An example of the decrease in the Cu leach rate associated with this invention was developed using three different Cu catalysts to treat different refinery waste waters. In this example, the catalysts, $CuO/Al_2O_3$, CuS/carbon, and Cu/zeolite X (for example, Cu-exchanged zeolite Type 13X) were used to treat waste water from 2 petroleum refineries. The catalysts were prepared as follows:

1. $CuO/Al_2O_3$ was prepared by impregnation of $Al_2O_3$ with $Cu(NO_3)_2$ and calcined.
2. CuS/carbon was prepared by impregnation of activated carbon using $Cu(NO_3)_2$ and calcined to obtain CuO/C. The CuO was sulfided to obtain CuS/C.
3. The Cu/zeolite X was prepared by ion exchanging 5 g of zeolite Type sodium 13X extrudate with 100 cc of 0.05N $Cu(NH_3)_4^{++}$ at 50° C. for 2 hrs. Thus prepared, the Cu/zeolite X catalyst contained about 3 wt % copper. Since the total exchange capacity of Type 13X zeolite for copper is about 22%, the Cu/zeolite X was exchanged with copper to about 13.6% of its exchange capacity. Then, the Cu/zeolite X was calcined by heating in air to 450° C. at 1° C./min. and holding at 450° C. for 4 hrs.

Figure 3:
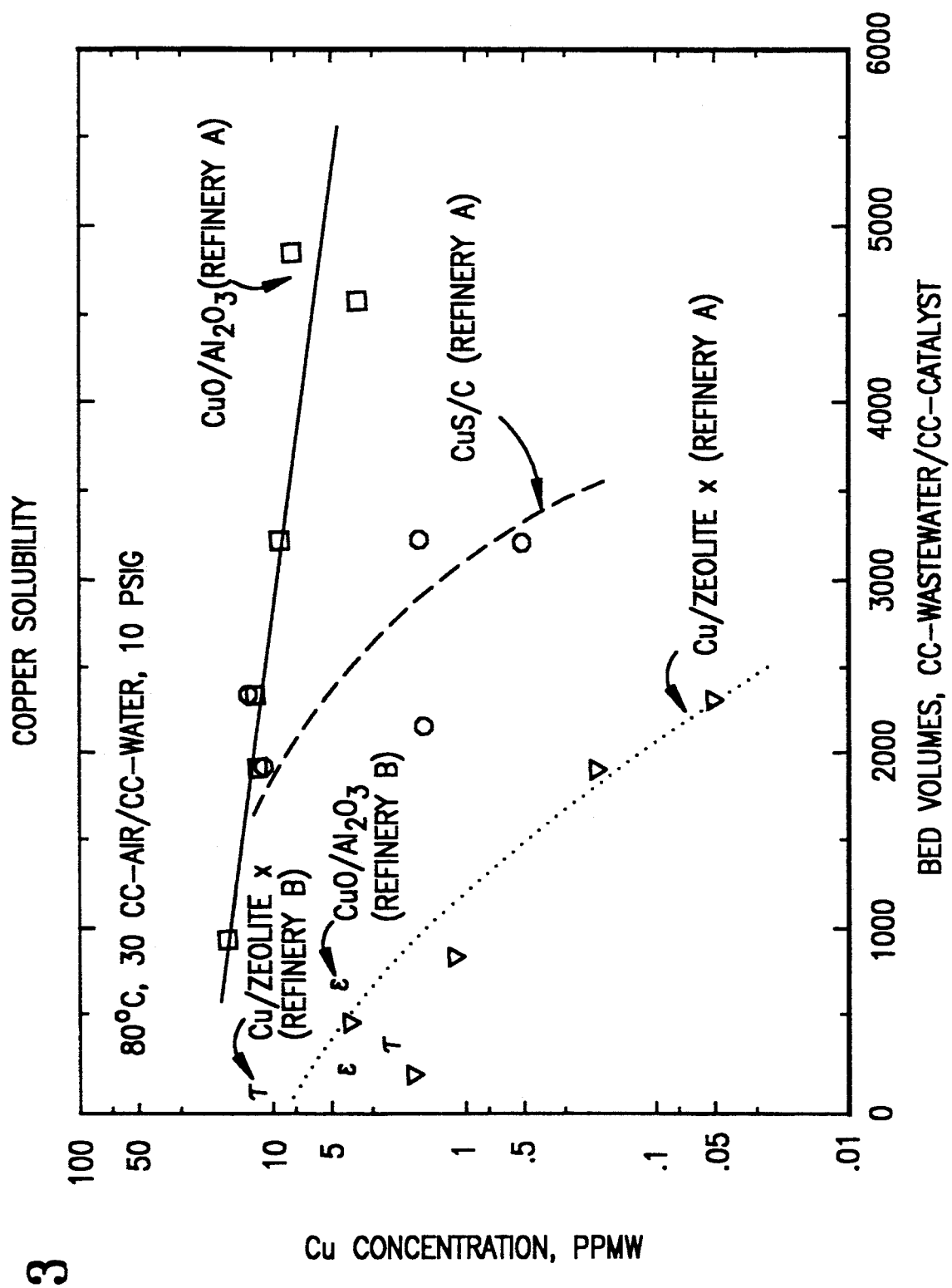
FIG. 3 is a graph of ppm Cu concentration in treated waste water vs. Bed Volumes of treated waste water in cc of waste water per cc of catalyst.

Samples of waste waters containing ammonia and cyanide were obtained from two petroleum refineries, referred to as "Refinery A" and "Refinery B." The waste water was used to test the above catalysts and the results of the test are displayed graphically in FIG. 3. The three catalysts described above were tested for cyanide removal and Cu leaching with the waste water from Refinery A. Two of the catalysts described above, $CuO/Al_2O_3$ and Cu/zeolite X were tested with the waste water from Refinery B. FIG. 3 shows copper concentration in ppm versus bed volumes of treated waste water for each of these catalyst-waste water combinations. The test conditions were 80° C., 30 cc air/cc water and 5 LHSV at 10 psig. The products after processing different bed volumes of waste water were analyzed for cyanide and Cu. Cyanide removals were 90 to 99% for all catalysts. The Cu contents in the product from Cu/zeolite X diminished rapidly to a low level, while the Cu contents in the products from CuS/carbon and $CuO/Al_2O_3$ decreased much more slowly. This reduction in the leach rate for Cu from the Cu/zeolite X catalyst was accomplished while maintaining cyanide detoxification activity. The initial high Cu concentration in the waste water product from Cu/zeolite X is speculated to be due to the small amount of Cu exposed outside of the zeolite cage after ion exchange. The initial leaching of Cu can be alleviated by washing the ion exchanged Cu/zeolite with water to remove the externally adsorbed Cu before calcination.

Obviously, many other variations and modifications of this invention as previously set forth may be made without departing from the spirit and scope of this invention as those skilled in the art readily understand. Such variations and modifications are considered part of this invention and within the purview and scope of the appended claims.

I claim:

1. A method for reducing the concentration of offensive substances and the chemical oxygen demand of ammonia-containing waste water comprising the steps of:
    (a) feeding said ammonia-containing waste water comprising at least one offensive substance, along with a source of oxygen into a reaction zone containing a catalyst comprising a zeolite substrate containing Cu, said catalyst having been prepared by partially ion exchanging said Cu onto said zeolite under exchange conditions adjusted to limit the Cu exchange to between about 1 to about 90% of the ion exchange capacity of the zeolite, thereby lowering the amount of leaching of Cu into the ammonia-containing waste water relative to the amount of Cu leaching which would occur using a zeolite catalyst fully ion-exchanged with Cu;
    (b) contacting said ammonia-containing waste water and said source of oxygen with said catalyst which catalytically oxidizes said offensive substance; and
    (c) discharging the waste water from the reaction zone whereby said waste water has a substantially lower concentration of said offensive substance.

2. The process as described in claim 1 comprising adjusting the ion exchange conditions to limit the Cu exchange to between about 5 and about 75% of the ion exchange capacity of the zeolite.

3. The process as described in claim 1 comprising washing the Cu exchanged zeolite with water to remove externally adsorbed Cu.

4. The process as described in claim 1 comprising selecting the zeolite substrate from those zeolites having a pore size of about 3.6 to about 10 Angstroms.

5. The process as described in claim 1 comprising selecting the zeolite substrate from zeolite A, zeolite X, zeolite Y, ZSM-5, erionite, and chabazite.

6. The process as described in claim 1 comprising treating a waste water comprising at least one offensive substance selected from cyanide, sulfide, thiosulfate, sulfite, mercaptan, disulfide, and mixtures thereof.

7. The process as described in claim 2 comprising selecting the zeolite substrate from those zeolites having a pore size of about 3.6 to about 10 Angstroms.

8. The method as described in claim 2 comprising selecting the zeolite substrate from zeolite A, zeolite X, zeolite Y, ZSM-5, erionite, and chabazite.

9. The process as described in claim 1 further comprising treating waste water produced by an industrial plant selected from a petroleum refinery, chemical plant, pulp and paper plant, mining operation, electroplating operation, or food processing plant.

10. In a waste water cyanide removal process wherein a waste water is contacted with a catalyst under oxidative waste water cyanide removal conditions, the improvement which comprises treating ammonia-containing waste water with an oxidizing agent and a catalyst comprising a zeolite substrate containing Cu, said catalyst having been prepared by partially ion exchanging said Cu onto said zeolite under exchange conditions adjusted to limit the Cu exchange to between about 1 to about 90% of the ion exchange capacity of the zeolite, thereby lowering the amount of leaching of Cu into the ammonia-containing waste water relative to the amount of Cu leaching which would occur using a zeolite catalyst fully ion-exchanged with copper.

11. The process as described in claim 10 comprising adjusting the ion exchange conditions to limit the Cu exchange to between about 5 and about 75% of the ion exchange capacity of the zeolite.

12. The process as described in claim 10 comprising selecting the zeolite substrate from those zeolites with a pore size of about 3.6 to about 10 Angstroms.

13. The process as described in claim 10 comprising selecting the zeolite substrate from zeolite A, zeolite X, zeolite Y, ZSM-5, erionite, and chabazite.

14. The process as described in claim 11 comprising selecting the zeolite substrate from the zeolites with a pore size of about 3.6 to about 10 Angstroms.

15. The method as described in claim 11 comprising selecting the zeolite substrate from zeolite A, zeolite X, zeolite Y, ZSM-5, erionite, and chabazite.

16. A method for reducing the concentration of offensive substances and the chemical oxygen demand of ammonia-containing waste water comprising the steps of:

(a) preparing a catalyst comprising a zeolite substrate containing Cu by partially ion exchanging said Cu onto said zeolite under exchange conditions adjusted to limit the Cu exchange to between about 5 to about 75% of the ion exchange capacity of the zeolite, thereby lowering the amount of leaching of Cu into the ammonia-containing waste water relative to the amount of Cu leaching which would occur using a zeolite catalyst fully ion-exchanged with copper, said zeolite substrate selected from zeolite A, zeolite X, zeolite Y, ZSM-5, erionite, and chabazite;

(b) washing the Cu exchanged zeolite with water to remove externally adsorbed Cu;

(c) calcining the water washed Cu exchanged zeolite;

(d) feeding said ammonia-containing waste water comprising at least one offensive substance selected from cyanide, sulfide, thiosulfate, sulfite, mercaptan, disulfide, and mixtures thereof, along with a source of oxygen into a reaction zone containing the calcined Cu exchanged zeolite catalyst;

(e) contacting said ammonia-containing waste water and said source of oxygen with said catalyst which catalytically oxidizes said offensive substance; and (f) discharging the waste water from the reaction zone whereby said waste water has a substantially lower concentration of said offensive substance.

* * * * *